United States Patent
Ashikhmin et al.

(10) Patent No.: US 8,140,070 B2
(45) Date of Patent: Mar. 20, 2012

(54) METHODS FOR REDUCING INTER-CELL INTERFERENCE BY PRECODING SIGNALS FOR TRANSMISSION IN WIRELESS MIMO SYSTEM

(75) Inventors: Alexei Ashikhmin, Morristown, NJ (US); Jubin Jose, Austin, TX (US); Thomas Marzetta, Summit, NJ (US)

(73) Assignee: Alcatel Lucent, Paris (FR)

( * ) Notice: Subject to any disclaimer, the term of this patent is extended or adjusted under 35 U.S.C. 154(b) by 464 days.

(21) Appl. No.: 12/320,864

(22) Filed: Feb. 6, 2009

(65) Prior Publication Data

US 2010/0203912 A1 Aug. 12, 2010

(51) Int. Cl.
*H04W 24/00* (2009.01)
(52) U.S. Cl. .................................................. 455/424
(58) Field of Classification Search ................. None
See application file for complete search history.

(56) References Cited

U.S. PATENT DOCUMENTS

| | | | | |
|---|---|---|---|---|
| 2008/0240274 A1* | 10/2008 | Han et al. | | 375/260 |
| 2010/0284359 A1* | 11/2010 | Kim et al. | | 370/329 |
| 2010/0303002 A1* | 12/2010 | Zorba Barah et al. | | 370/316 |

* cited by examiner

*Primary Examiner* — Lincoln Donovan
*Assistant Examiner* — Sibin Chen
(74) *Attorney, Agent, or Firm* — Harness, Dickey & Pierce

(57) ABSTRACT

Methods for suppressing inter-cell interference during data transmission using a precoding matrix are provided. Inter-cell interference is suppressed by precoding data (or information) signals for transmission from base station to mobile or vice versa. Methods according to example embodiments also increase intra-cell data transmission rates. The precoding matrix is generated based on estimated channel coefficients for propagation channels between a base station and mobiles inside and outside the base station's coverage area.

13 Claims, 5 Drawing Sheets

METHODS FOR REDUCING INTER-CELL INTERFERENCE BY PRECODING SIGNALS FOR TRANSMISSION IN WIRELESS MIMO SYSTEM

BACKGROUND OF THE INVENTION

Wireless multiple-input-multiple-output (MIMO) systems represent an advance in wireless communication. MIMO systems employ two or more antennas at the transmitting and/or receiving ends of a wireless link. The multiple antennas improve data transmission rates, while holding radio bandwidth and power constant.

A MIMO transmitter transmits an outgoing signal using multiple antennas by demultiplexing the outgoing signal into multiple sub-signals and transmitting the sub-signals from separate antennas. MIMO exploits the multiple signal propagation paths to increase throughput and reduce bit error rates. Using MIMO techniques the rate of transmission increases linearly depending on the local environment.

In a conventional wireless MIMO system, when base stations in adjacent or closely located cells transmit concurrently or simultaneously, signals transmitted from a first base station in a first cell may interfere with signals transmitted from a second base station in an adjacent or closely located second cell. In more detail, signals transmitted by the first base station in the first cell are seen as interference by mobiles located in the adjacent second cell. Similarly, signals transmitted by the second base station are seen as interference by mobiles in the first cell. This type of interference is known as inter-cell interference. Inter-cell interference prevents faster data transmission between base station and mobile within a given cell (known as intra-cell transmission).

Conventionally, inter-cell interference is reduced using frequency reuse methods. In this approach, different frequency bands are used within adjacent cells because adjacent cells create the most significant interference to each other. But, conventional frequency reuse methods reduce intra-cell data transmission rates between the base station and mobiles in the same cell.

For example, in a frequency reuse of 3 method, each base station transmits data using a bandwidth of F/3, where F is the full bandwidth for the air interface. In this example, each base station's data transmission rate is only about one-third of the nominal data transmission rate. As one can appreciate, this is significantly less than if inter-cell interference were not present. Such a decrease in bandwidth within a cell is undesirable, but unavoidable in the conventional art.

SUMMARY OF THE INVENTION

Example embodiments provide methods for transmitting data so as to suppress inter-cell interference, while increasing intra-cell transmission rates between radio equipped devices (e.g., base stations and mobiles). Methods according to example embodiments do not require any collaboration between radio equipped devices such as base stations, so each radio equipped device acts autonomously.

In one embodiment, during uplink training, a base station in a first cell receives training sequences transmitted synchronously from all mobiles in all cells located relatively close to the base station. After receiving the training sequences, the base station estimates channel coefficient matrices based on the received training sequences transmitted by the mobiles, and generates a precoding matrix based on the estimated channel coefficient matrices. The base station precodes information signals for transmission using the generated precoding matrix, and transmits the precoded information signals to mobiles.

In one example embodiment, a first radio equipped device in a first cell generates a precoding matrix based on a set of estimated first channel coefficients and a set of estimated second channel coefficients. The set of estimated first channel coefficients are associated with a set of first propagation channels between a plurality of second radio equipped devices in the first cell and a plurality of antennas at the first radio equipped device. The set of estimated second channel coefficients is associated with a set of second propagation channels between a plurality of third radio equipped devices in a second cell and the plurality at antennas of the first radio equipped device. The first radio equipped device precodes signals for transmission from the first radio equipped device to at least one second radio equipped device based on the precoding matrix to reduce inter-cell and intra-cell interference.

In another example embodiment, a first radio equipped device in a first cell generates a precoding matrix based on an estimation of a sum of an intra-cell transmission error associated with the first cell and inter-cell interference created by signal transmission by the first radio equipped device. The intra-cell transmission error represents a difference between signals transmitted between the first radio equipped device in the first cell and a plurality of second radio equipped devices in the first cell. The first radio equipped device precodes signals for transmission from the first radio equipped device to at least one of the plurality of radio equipped devices using the precoding matrix to reduce inter-cell and intra-cell interference.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Figure 1:
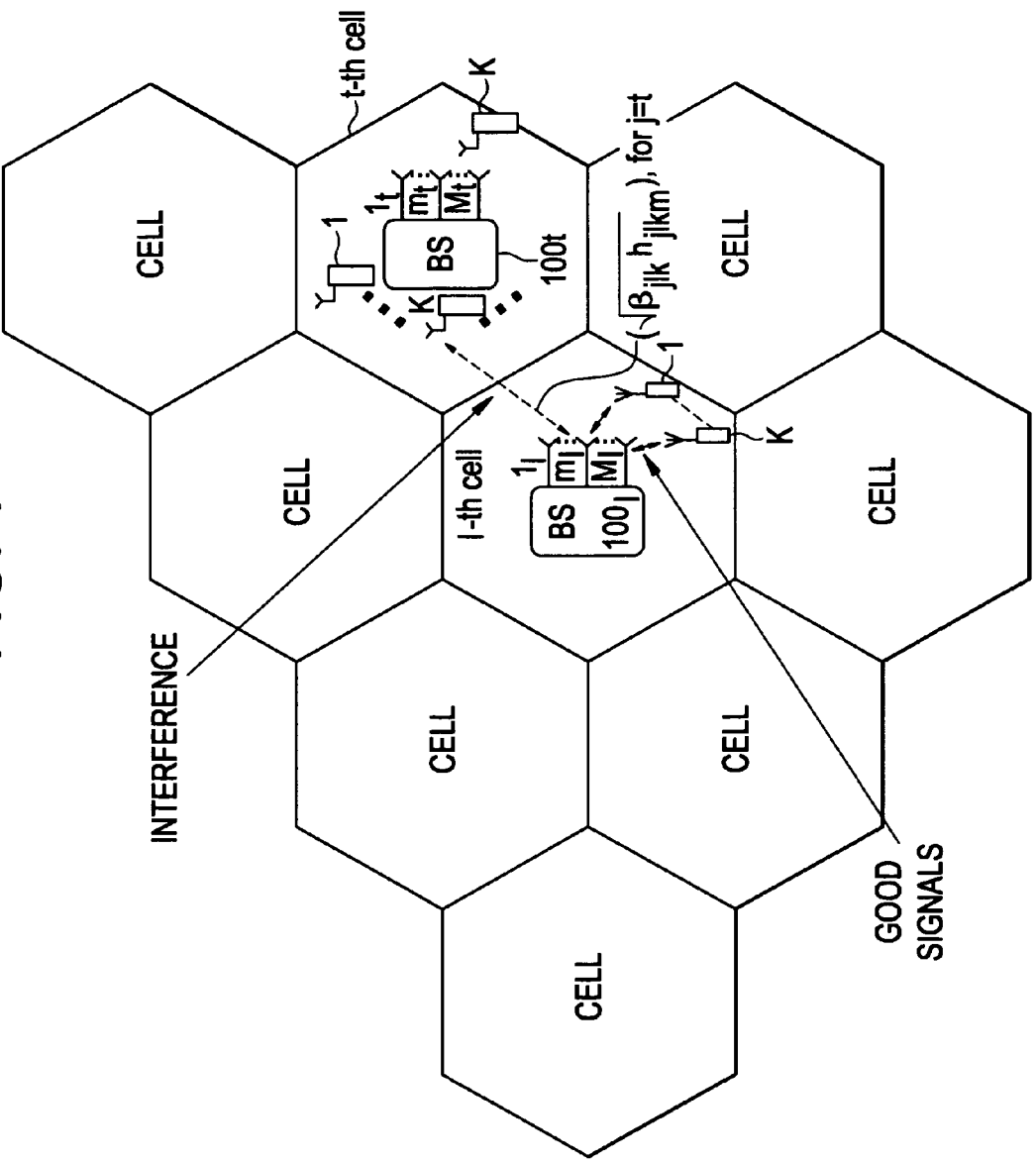
FIG. 1 illustrates a portion of a conventional multiple-input-multiple-output (MIMO) multi-user wireless broadcast system.

Example embodiments provide methods for suppressing inter-cell interference during data transmission. Inter-cell interference is suppressed by precoding data (or information) signals for transmission from base station to mobile or vice versa. Methods according to example embodiments also increase intra-cell data transmission rates.

Before discussing example embodiments in more detail, it is noted that example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods illustrated by the flow charts discussed below may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

As disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, and various other mediums capable of storing and/or containing instruction(s) and/or data.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used herein, the term "mobile" may be considered synonymous to, and may hereafter be occasionally referred to, as a client, mobile unit, mobile station, mobile user, user equipment (UE), subscriber, user, remote station, access terminal, receiver, etc., and may describe a remote user of wireless resources in a wireless communication network.

Similarly, as used herein, the term "base station" may be considered synonymous to, and may hereafter be occasionally referred to, as a Node B, base transceiver station (BTS), etc., and may describe a transceiver in communication with and providing wireless resources to mobiles in a wireless communication network. As discussed herein, base stations may have all functionally associated with conventional, well-known base stations in addition to the capability to perform the methods discussed herein.

Collectively, base stations and mobiles may be referred to as radio equipped devices.

FIG. 1 illustrates a portion of a wireless multiple-input-multiple-output (MIMO) system.

Referring to FIG. 1, the MIMO system includes L number of cells (where L is an integer) covering a relatively large geographical area. Each of the L cells includes a base station with M antennas and K mobiles, where each of K and M are integers and K<M. For the sake of brevity, in some situations only the l-th and t-th cell will be described in detail. However, it will be understood that each of the other L cells in FIG. 1 may be similar to (or the same as) the l-th and/or t-th cell shown in FIG. 1. Moreover, for the sake of clarity, each cell is discussed as serving K number of mobiles; however it will be understood that each cell may serve a different number of mobiles at any given time.

In the following discussion notation 'j' is an index representing a given cell among the L cells in FIG. 1, wherein the set of L cells includes the l-th and t-th cell. Thus, the j-th cell may represent the l-th cell, the t-th cell, as well as the other L cells in FIG. 1.

As shown in FIG. 1, the l-th cell includes a base station $100l$ having a plurality of antennas $1_l$-$M_l$. Antenna $m_l$ represents the m-th antenna among the plurality of antennas $1_l$-$M_l$. The base station $100l$ serves a plurality of mobiles 1-K within the l-th cell.

The adjacent t-th cell includes a base station $100t$ having a plurality of antennas $1_t$-$M_t$. Antenna $m_t$ represents the m-th antenna among the plurality of antennas $1_t$-$M_t$. The base station $100t$ serves a plurality of mobiles 1-K within the t-th cell.

According to example embodiments, each of the plurality of mobiles in the l-th and the t-th cells may have one or more antennas. However, for the sake of this discussion, it is assumed that each mobile is a single antenna mobile.

When base stations $100l$ and $100t$ transmit concurrently or simultaneously, signals transmitted by the base station $100l$ are seen as interference by the K mobiles in, for example, the adjacent t-th cell. Similarly, signals transmitted by the base station $100t$ are seen as interference by mobiles 1-K in the l-th cell. This type of interference is known as inter-cell interference. This inter-cell interference prevents faster data transmission between base station and mobile within a given cell (known as intra-cell transmission). Example embodiments provide methods for reducing this inter-cell interference during transmission.

Example embodiments will be described with regard to a time division duplexing (TDD) orthogonal frequency division multiplexing (OFDM) scheme in which data transmissions in the uplink (from mobile to base station) and downlink (from base station to mobile) are time-shifted relative to one another. However, it will be understood that example embodiments may be implemented in other MIMO systems as well as other wireless communication systems and/or schemes. For example, methods discussed herein may be implemented in connection with a frequency division duplexing (FDD) or similar scheme.

As is well-known, a conventional OFDM scheme includes several frequency bins. In each frequency bin, data is transmitted independently from other bins. Example embodiments will be described with regard to data transmission in a single frequency bin. However, it will be understood that methods according to example embodiments may be applied in the same or substantially the same manner in all other bins.

Furthermore, example embodiments will be described with regard to operations performed during a single coherence interval of T symbols. However, it will be understood that the methods described herein may be performed independently during each coherence interval.

Figure 5:
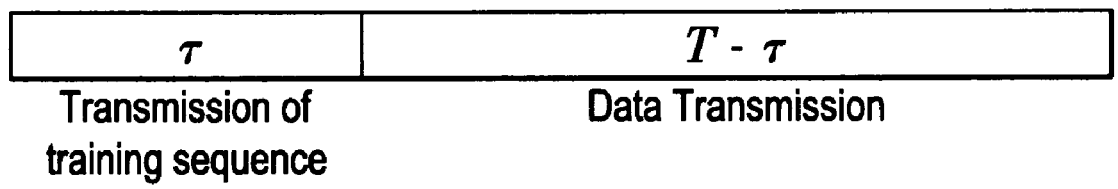
FIG. 5 illustrates an example coherence interval including a training sequence interval and a data transmission interval.

As is well-known, in an OFDM communication scheme, a coherence interval is a time interval for which channel gain is assumed to remain constant. In a TDD OFDM communication scheme, any given coherence interval of T symbols includes two phases: an uplink training interval of $\tau$ symbols and a data transmission interval of $(T-\tau)$ symbols. FIG. 5 illustrates an example coherence interval of T symbols.

To ensure full understanding of example embodiments, a brief general discussion of transmission and reception of signals and training sequences between mobiles in all L cells and base station $100l$ will be provided before describing example embodiments in more detail.

General Discussion of Signal Transmission and Training Sequence Transmission Between Mobiles and Base Station 100*l*

Referring back to FIG. 1, during uplink transmission (from mobile to base station), a signal $x_k$ transmitted by the k-th mobile k in a j-th cell (where j=t, for example) propagates to all M antennas of each base station in each of the L cells. During propagation to the m-th antenna of the base station 100*l*, for example, the signal $x_k$ is multiplied by $\sqrt{\beta_{jlk}} h_{jlkm}$ (for j=t), which is a product of the known propagation factor $\sqrt{\beta_{jlk}}$ and the unknown channel coefficient $h_{jlkm}$. The propagation factor $\sqrt{\beta_{jlk}}$ is the propagation factor for the propagation channel between the base station 100*l* and the k-th mobile in the j-th cell. The propagation factor $\sqrt{\beta_{jlk}}$ is known because $\{\beta_{jlk}\}$ are non-negative constants known to all base stations and all mobiles within the MIMO system.

The channel coefficient $h_{jlkm}$ is the channel coefficient for the propagation channel between the k-th mobile in the j-th cell and the m-th antenna $m_l$ of the base station 100*l*. As is well-known, channel coefficients $h_{jlkm}$ are random variables with known or approximately known distributions. As is also well-known, the channel coefficients $h_{jlkm}$ for the K mobiles in the j-th of the L cells and the $M_l$ antennas at the base station 100*l* form a matrix given by Equation (1) shown below.

$$H_{jl} = \begin{bmatrix} h_{jl11} & \cdots & h_{jl1M} \\ \vdots & \ddots & \vdots \\ h_{jlK1} & \cdots & h_{jlKM} \end{bmatrix} \quad (1)$$

Given the above discussion, a signal $x_k$ transmitted by the k-th mobile in the j-th cell is received at the m-th antenna of the base station 100*l* as interference signal $y_k$ given by Equation (2) shown below.

$$y_k = \sqrt{\sqrt{p_r \beta_{jlk}}} h_{jlkm} x_k + w_k \quad (2)$$

In Equation (2), $w_k$ is the additive noise.

As noted above, during the above-noted uplink training interval of τ symbols, the signal transmitted by each of the mobiles in each of the L cells is a training sequence $\psi_{jk}$ (e.g., a pilot sequence). Given Equation (2), when the training sequences $\psi_{jk}$ are transmitted the m-th antenna mi of the base station 100*l* receives the interference signal $y_{lm}$ given by Equation (3) shown below.

$$y_{lm} = \sum_{j=1}^{L} \sum_{k=1}^{K} \sqrt{p_r \beta_{jlk}} \, h_{jlkm} \psi_{jk} + w_{lm} \quad (3)$$

In Equation (3), $w_{lm}$ is additive noise and $p_r$ is the known average receiving power at each of the $M_l$ antennas. As discussed above, the number L represents the number of cells in the MIMO system.

Given Equation (3), the received signal vector $Y_l$ including training sequences received by each of the $M_l$ antennas at the base station 100*l* is $Y_l = (y_{l1}, y_{l2}, \ldots, y_{lM})$.

Discussion of Example Embodiments

Figure 2:
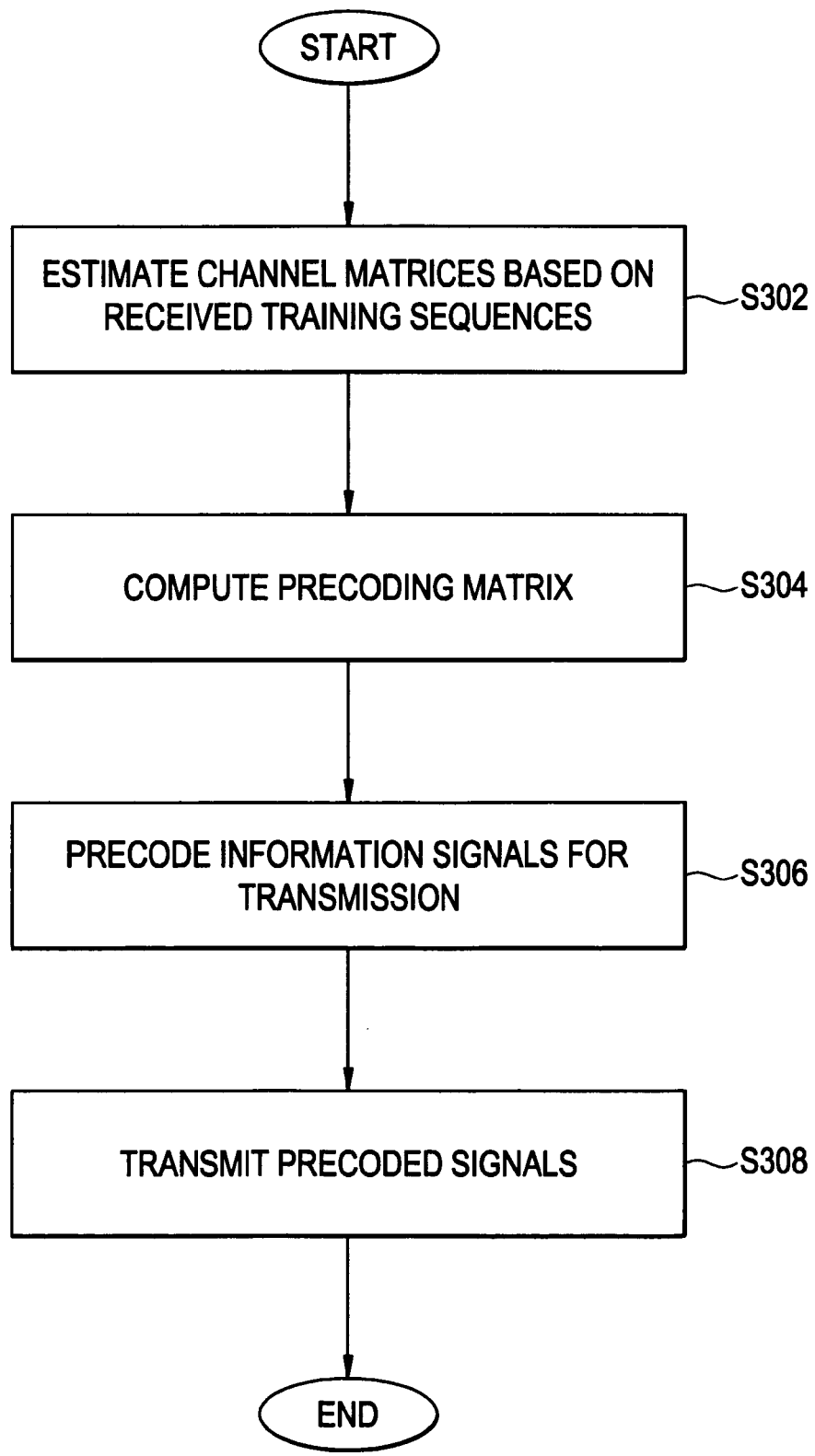
FIG. 2 is a flow chart illustrating an example embodiment of a method for suppressing inter-cell interference when transmitting data between base stations and mobiles.

FIG. 2 is a flowchart illustrating an example embodiment of a method for suppressing inter-cell interference during transmission of signals between radio equipped devices such as base station and mobile. The method shown in FIG. 2 may be implemented at, and will be discussed in connection with, the base station 100*l* in FIG. 1. However, it will be understood that similar or the same methods may be implemented at the base station 100*t* and all other base stations in the MIMO system shown in FIG. 1.

Referring now to FIG. 2, after receiving the training sequences $\psi_{jk}$ transmitted from all mobiles, the base station 100*l* estimates channel coefficient matrices $H_{jl}$ (referred to herein as the estimated channel coefficient matrices $\hat{H}_{jl}$) between the mobiles transmitting the training sequences and the $M_l$ antennas at the base station 100*l* at step S302. The base station 100*l* generates each of the estimated channel matrices $\hat{H}_{jl}$ based on the received signal vector $Y_l = (y_{l1}, y_{l2}, \ldots, y_{lM})$ known probability distributions of the channel coefficients $h_{jlkm}$. The base station 100*l* generates the estimated channel matrices $\hat{H}_{jl}$ using a standard minimum mean square error (MMSE) estimator. Because MMSEs and methods of generating estimated channel coefficient matrices are well-known, a detailed discussion will be omitted.

In this example, the mobiles having transmitted the training sequences includes mobiles in all L cells, which are represented by the index j, where j=1, 2, ..., L. Accordingly, the base station 100*l* generates an estimated channel coefficient matrix $\hat{H}_{jl}$ for propagation channels between the base station 100*l* and mobiles in each of the L cells. In other words, the base station 100*l* generates a plurality of estimated channel coefficient matrices $\hat{H}_{jl}$, each of the plurality of estimated channel coefficient matrices $\hat{H}_{jl}$ being associated with a j-th cell among the L cells.

Each of the estimated channel coefficient matrices $\hat{H}_{jl}$ generated at step S302 is a matrix of estimated channel coefficients for propagation channels between the mobiles in the j-th cell and the $M_l$ antennas at the base station 100*l* as shown below in Equation (4).

$$\hat{H}_{jl} = \begin{bmatrix} \hat{h}_{jl11} & \cdots & \hat{h}_{jl1M} \\ \vdots & \ddots & \vdots \\ \hat{h}_{jlK1} & \cdots & \hat{h}_{jlKM} \end{bmatrix}, \text{ for } j = 1, 2, \ldots, L \quad (4)$$

Still referring to FIG. 2, at step S304, during the data transmission interval, the base station 100*l* computes a precoding matrix $A_l$ based on the estimated channel coefficient matrices $\hat{H}_{jl}$. As discussed above, the estimated channel coefficient matrices $\hat{H}_{jl}$ include estimated channel coefficient matrices associated with the l-th cell (j=l) in which the base station 100*l* is located in addition to estimated channel coefficient matrices $\hat{H}_{jl}$ associated with the other of the L cells (where j≠l).

The computed preceding matrix $A_l$ is an M×K complex matrix computed to satisfy the precoding matrix condition $Tr(A_l^* A_l) = 1$. As is well-known, the operator $Tr(A)$ is the standard trace of operators of a square matrix A. For example, if $a_{ij}$ are elements of A, and A is an M×M matrix, then $$Tr(A) = \sum_{i=1}^{M} \alpha_{ii}.$$

Here, (*) denotes Hermitian conjugation of a complex matrix.

In order to maximize the magnitude of the useful signal in the l-th cell, while minimizing inter-cell and intra-cell interference, the base station 100*l* computes the precoding matrix $A_l = A_l^{opt}$ according to Equation (5) shown below. As will be discussed in more detail later, the preceding matrix Al is used to precode data signals for transmission from the base station 100*l* to mobiles in the l-th cell (for intra-cell communication).

$$A_l^{opt} = \frac{1}{\alpha}\left(\hat{F}_{ll}^*\hat{F}_{ll} + \gamma^2\sum_{j\neq l}\hat{F}_{jl}^*\hat{F}_{jl} + \eta I_M\right)^{-1}\hat{F}_{ll}^* \quad (5)$$

In Equation (5), $\alpha$ is a precoding matrix condition parameter chosen such that the precoding matrix condition $Tr((A_l^{opt})^*A_l^{opt})=1$. The matrices $\hat{F}_{jl}$ are scaled estimated channel coefficient matrices generated based on the estimated channel coefficient matrices $\hat{H}_{jl}$. As discussed above, each estimated channel coefficient matrix $\hat{H}_{jl}$ includes estimated channel coefficients $\hat{h}_{jlkm}$ between the mobiles in a j-th cell among the L cells and the base station 100*l*.

In more detail, each of the scaled estimated channel coefficient matrices $\hat{F}_{jl}$ is the product of an estimated channel coefficient matrix $\hat{H}_{jl}$, the diagonal matrix $D_{jl}^{1/2}$ (or $\sqrt{D_{jl}}$) and the known transmission power $p_f$ at the $M_l$ antennas of the base station 100*l*. The matrix $D_{jl}=\text{diag}\{[\beta_{jl1}, \beta_{jl2}, \ldots, \beta_{jlK}]\}$, where $\text{diag}\{d\}$ is a diagonal matrix whose diagonal is equal to the vector d and $\beta_{jl1}, \beta_{jl2}, \ldots, \beta_{jlK}$ are known propagation factors. Each scaled estimated channel coefficient matrix $\hat{F}_{jl}$ is given by Equation (6) shown below.

$$\hat{F}_{jl} = \sqrt{p_t}D_{jl}^{1/2}\hat{H}_{jl} \quad (6)$$

Because an MMSE estimator is used for generating the estimated channel coefficient matrix $\hat{H}_{jl}$ as discussed above, the entries of matrix $\hat{F}_{jl}$ are random variables with known or approximately known distributions.

Still referring to Equation (5), the scaled estimated channel coefficient matrix $\hat{F}_{ll}$ is the scaled estimated channel coefficient matrix $\hat{F}_{jl}$ for j=l. In more detail, the scaled estimated channel coefficient matrix $\hat{F}_{ll}$ is given by Equation (7) shown below.

$$\hat{F}_{ll} = \sqrt{p_t}D_{ll}^{1/2}\hat{H}_{ll} \quad (7)$$

The estimated channel coefficient matrix $\hat{H}_{ll}$ includes estimated channel coefficients $\hat{h}_{llkm}$ for propagation channels between the K mobiles in the l-th cell and the base station 100*l*. Because the MMSE estimator is used for generating the estimated channel coefficient matrix $\hat{H}_{ll}$ as discussed above, the entries in the scaled estimated channel coefficient matrix $\hat{F}_{ll}$ are also random variables with known or approximately known distributions.

Again referring to Equation (5), $\eta$ is an interference variance parameter given by Equation (8) shown below.

$$\eta = \delta_{ll} + \gamma^2\sum_{j\neq l}\delta_{jl} + K \quad (8)$$

In Equation (8), $\gamma$ is an inter-cell interference propagation parameter, and $\delta_{ll}$ is the variance of the channel coefficient estimation error $\tilde{h}_{llkm}$. The channel coefficient estimation error $\tilde{h}_{llkm}$ represents the difference between an actual channel coefficient $h_{llkm}$ and the estimated channel coefficient $\hat{h}_{llkm}$ between the k-th mobile in the l-th cell and the base station 100*l*. More specifically, the channel coefficient estimation error $\tilde{h}_{llkm}$ is given by Equation (9) shown below.

$$\tilde{h}_{llkm} = h_{llkm} - \hat{h}_{llkm} \quad (9)$$

Still referring to Equation (8), $\delta_{jl}$ is the variance of the channel coefficient estimation error $\tilde{h}_{jlkm}$ between the mobiles in the j-th cell and the $M_l$ antennas of the base station 100*l* in the l-th cell. The channel coefficient estimation error $\tilde{h}_{jlkm}$ represents the difference between the actual channel coefficient $h_{jlkm}$ and the estimated channel coefficient $\hat{h}_{jlkm}$. The variance $\delta_{jl}$ is given by Equation (10) shown below.

$$\delta_{jl} = p_t Tr\{D_{jl}(I_K + p_r D_{jl}^{1/2}\Psi_j^*\Lambda_{jl}\Psi_j D_{jl}^{1/2})^{-1}\} \quad (10)$$

In Equation (10), $I_K$ is the identity matrix for the K mobiles in the j-th cell and $D_{jl}=\text{diag}\{[\beta_{jl1}, \beta_{jl2}, \ldots, \beta_{jlK}]\}$ as discussed above. Still referring to Equation (10), training signal vector $\Psi_j = [\psi_{j1}, \psi_{j2}, \ldots, \psi_{jK}]$ is formed by the training sequences $\psi_{jk}$ transmitted by the K mobiles in the j-th cell, and $\Lambda_{jl}$ is given by Equation (11) shown below.

$$\Lambda_{jl} = \left(I_\tau + p_r\sum_{i\neq l}\Psi_i D_{jl}\Psi_i^*\right)^{-1} \quad (11)$$

In Equation (11), $I_\tau$ is an identity matrix.

As discussed above, the precoding matrix $A_l$ computed at step S304 is an M×K precoding matrix.

Still referring to step S304 in FIG. 2, the base station 100 may compute the precoding matrix $A_l = A_l^{opt}$ that satisfies Equation (12) shown below.

$$\text{maximize}_{A_l} E\left[\|(\alpha F_{ll}A_l q_l + z_l) - q_l\|^2 + \sum_{j\neq l}\|\alpha\gamma(F_{jl}A_l q_l)\|^2\right] \quad (12)$$

$$\text{subject to } TR(A_l^* A_l) = 1$$

In Equation (12), expectation E is the expectation of $$\left[\|(\alpha F_{ll}A_l q_l + z_l) - q_l\|^2 + \sum_{j\neq l}\|\alpha\gamma(F_{jl}A_l q_l)\|^2\right]$$

taken with respect to the distribution f of the scaled channel coefficient matrices $\tilde{F}hd\ jl$ and the known distribution of additive noise $z_l$. The result of Equation (12) may also be referred to as an estimation of a sum of an intra-cell transmission error associated with the cell 100*l* and inter-cell interference created by signal transmission by the base station 100*l*.

The term $\|(\alpha F_{ll}A_l q_l + z_l) - q_l\|^2$ is the sum of squares of differences between the information signals $q_l$ transmitted by the base station 100*l* and signals $\alpha F_{ll}A_l q_l + z_l$ received by the K mobiles in the l-th cell. The term $\|(\alpha F_{ll}A_l q_l + z_l) - q_l\|^2$ may also be referred to as an intra-cell transmission error ($\|(\alpha F_{ll}A_l q_l + z_l) - q_l\|^2$) associated with a l-th cell. The aggregate $$\sum_{j\neq l}\|\alpha\gamma(F_{jl}A_l q_l)\|^2$$

is the sum of squares of inter-cell interference created by the base station 100*l* in other (e.g., adjacent) cells, such as the j-th cell.

The scaled channel coefficient matrices $F_{jl}$ in Equation (12) are given by Equation (13) shown below and related to the scaled estimated channel coefficient matrices $\hat{F}_{jl}$, by virtue of Equation (14).

$$F_{jl} = \sqrt{p_t}D_{jl}^{1/2}H_{jl} \quad (13)$$

$$\tilde{F}_{jl} = F_{jl} - \hat{F}_{jl}, \quad (14)$$

In Equations (13) and (14), the scaled estimated channel coefficient matrices $F_{jl}$ are the product of the channel coefficient matrices $H_{jl}$, the diagonal matrix $D_{jl}^{1/2}$ and the known transmission power pf. Because the scaled estimated channel coefficient matrices $F_{jl}$ are generated as a function of the channel coefficient matrices $H_{jl}$, the entries of scaled estimated channel coefficient matrices $F_{jl}$ are also random variables with known or approximately known distributions.

In Equation (14), each matrix $\tilde{F}_{jl}$ is also a random matrix representing the estimation error or difference between the scaled channel coefficient matrix $F_{jl}$ and the scaled estimated channel coefficient matrix $\hat{F}_{jl}$. The entries of matrix $\tilde{F}_{jl}$ are also random variables with known or approximately known distributions.

As will be discussed in more detail below, the base station 100*l* computes the precoding matrix $A_l$ such that inter-cell interference of a noisy signal vector $x_j$ within a j-th cell is suppressed, while the gain of the K mobiles in the j-th cell is kept relatively large.

For mobiles in the l-th cell, the received noisy signal vector $x_j$ is given by Equation (15) shown below.

$$x_j = \sum_{j=1}^{L} \sqrt{p_f} \, D_{jl}^{1/2} H_{jl} A_l q_l + z_j \qquad (15)$$

As discussed above, $D_{jl}=\text{diag}\{[\beta_{jl1}, \beta_{jl2}, \ldots, \beta_{jlK}]\}$ and diag{d} is a diagonal matrix whose diagonal is equal to the vector d. The variable $z_j$ is additive noise.

Given the noisy signal vector $x_j$, the signal $x_{jk}$ received by the k-th mobile k in the j-th cell is given by Equation (16).

$$x_{jk} = \sum_{l=1}^{L} \sum_{i=1}^{K} \sqrt{p_f \beta_{jlk}} \, [h_{jlk1}, h_{jlk2}, \ldots, h_{jlkM}] a_{li} q_{li} + z_{jk} \qquad (16)$$

In Equation (16), $a_{li}$ is the i-th column of the precoding matrix $A_l$ and $z_{jk}$ is the k-th element of the additive noise $z_j$.

For the purpose of illustration, the case of j=1 and k=1 is considered. In this case, the signal $x_{11}$ received by the k-th (k=1) mobile in the j=1 (j=1) cell is given by Equation (17) shown below.

$$\begin{aligned}x_{11} = {} & \sqrt{p_f \beta_{111}} \, [h_{1111}, h_{1112}, \ldots, h_{111M}] a_{11} q_{11} + \\ & \sqrt{p_f \beta_{112}} \, [h_{1121}, h_{1122}, \ldots, h_{112M}] a_{12} q_{12} + \ldots + \\ & \sqrt{p_f \beta_{11K}} \, [h_{11K1}, h_{11K2}, \ldots, h_{11KM}] a_{1K} q_{1K} + \\ & \sum_{j=2}^{L} \sum_{i=1}^{K} \sqrt{p_f \beta_{jlk}} \, [h_{jlk1}, h_{jlk2}, \ldots, h_{jlkM}] a_{li} q_{li} + z_{jk}\end{aligned} \qquad (17)$$

In Equation (17), only the first term ($\sqrt{p_f \beta_{111}}[h_{1111}, h_{1112}, \ldots, h_{111M}]a_{11}q_{11}$) is the useful signal addressed to the k-th mobile (for k=1) in the j-th cell (for j=1). Terms 2, 3, . . . , K represent intra-cell interference, which is created by signals transmitted by the base station in the j-th cell to mobiles 2, . . . , K in the j-th cell. The last term in Equation (17), $$\sum_{j=2}^{L} \sum_{i=1}^{K} \sqrt{p_f \beta_{jlk}} \, [h_{jlk1}, h_{jlk2}, \ldots, h_{jlkM}] a_{li} q_{li} + z_{jk},$$

represents the inter-cell interference created by signals transmitted by the base stations located in cells other than the j-th cell. As discussed above, these base stations are attempting to transmit to mobiles within their respective cells, but their signals propagate to other cells, including the j-th cell. The precoding matrix $A_l$(l=j=1) generated as discussed above increases (e.g., maximizes) the value of the useful signal Re($\sqrt{p_f \beta_{111}}[h_{1111}, h_{1112}, \ldots, h_{111M}]a_{11}$), while suppressing (e.g., minimizing) these other terms representing inter-cell and intra-cell interference.

Referring back to FIG. 2, after having computed the precoding matrix $A_l$, the base station 100*l* precodes data signals $q_l$ for transmission to mobiles in the l-th cell at step S306. To precode the data signals $q_l$ for transmission, the base station 100*l* maps each information signal $q_l$ to be transmitted to respective mobiles 1, 2, . . . , K in the l-th cell into signals $s_m$ for m=1, . . . , M transmitted from respective antennas 1, . . . , M.

The base station 100*l* precodes information symbols $q_l = [q_{l1}, q_{l2}, \ldots, q_{lK}]^T$, to be transmitted by computing a signal vector S according to Equation (18) shown below using the preceding matrix $A_l$ computed at step S304.

$$S = \begin{bmatrix} s_1 \\ \vdots \\ s_M \end{bmatrix} = \sqrt{p_f} \, A_l q_l \qquad (18)$$

Equation (18) uses standard matrix multiplication to spread signals $q_1, q_2, \ldots, q_l$ into sub-signals $s_1, s_2, \ldots, s_M$. In this example, the precoding of the signals $q_1, q_2, \ldots, q_l$ spreads each of the signals among the $M_l$ antennas at the base station 100*l*. After precoding the signals at step S306, the base station 100*l* transmits the precoded signals $s_1, s_2, \ldots, s_M$ from antennas $1_l, 2_l, \ldots, M_l$, respectively, at step S308. The signals are transmitted to the destination mobiles in any well-known manner.

Figure 3:
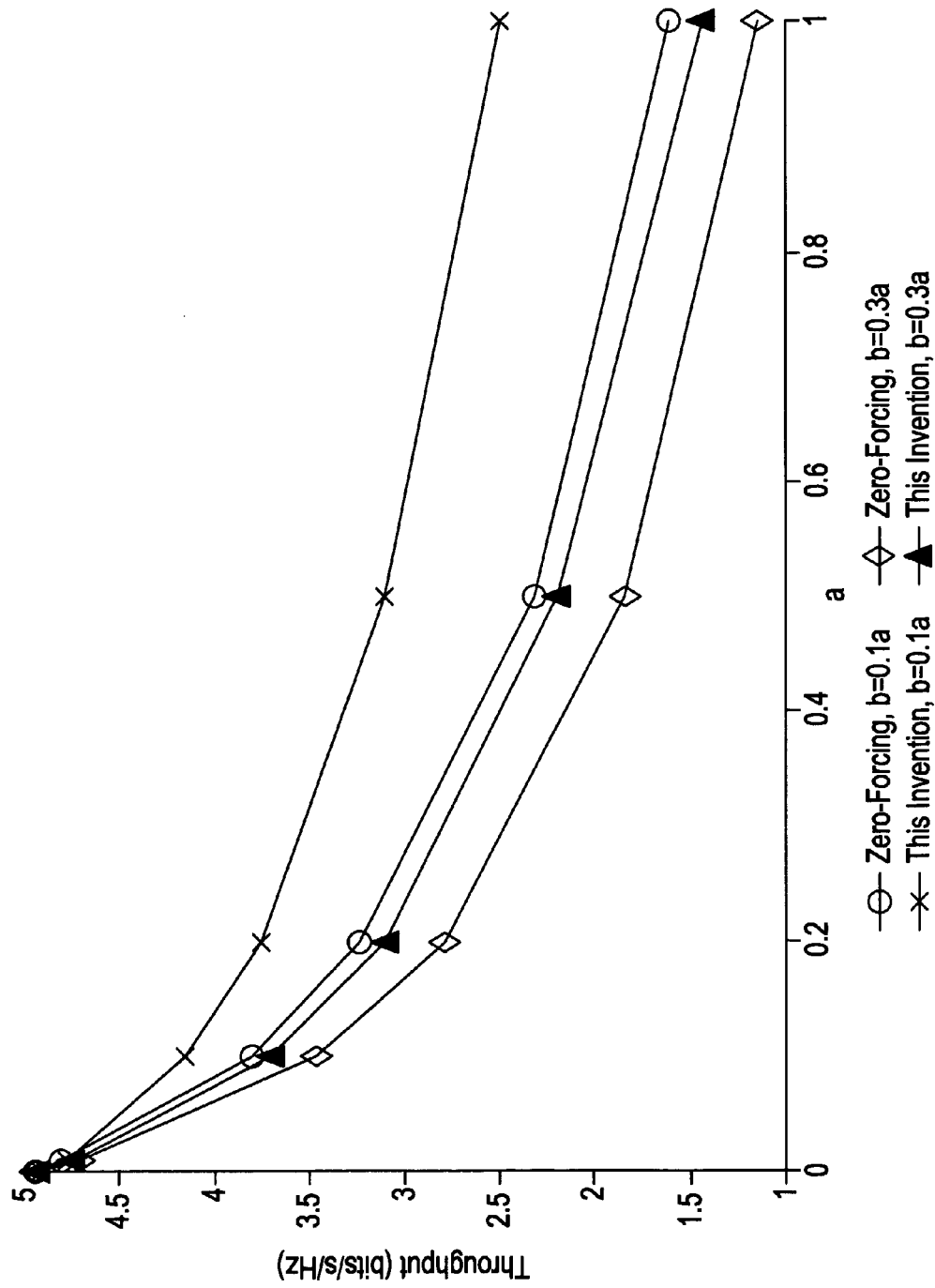
FIG. 3 illustrates simulation results for a case in which the number of cells L is 4.

FIG. 3 illustrates simulation results for a case in which the number of cells L is 4, each base station includes 8 antennas (M=8), and training sequences of length τ=4 are used by all mobiles in each cell. The number of mobiles in each cell is 2 (K=2), and $p_f$=20 dB and $p_r$=10 dB. Orthogonal training sequences are used in the $1^{st}$, $2^{nd}$, $3^{rd}$ and 4th cells, and the propagation factors $\beta_{jlk}$ for all pairs of the L cells are known as follows:

for all k mobiles, $\beta_{jlk}$=1 if j=l, and $\beta_{jlk}$=α if (j,l) ∈ {(1,2),(2,1),(3,4),(4,3)}; and for all other values of j and l, $\beta_{jlk}$=b.

In the example shown in FIG. 3, value 'a' is less than 1 and 'b' is less than 'a' and a base station utilizing methods according to example embodiments out performs the traditional Frequency Reuse approach.

Figure 4:
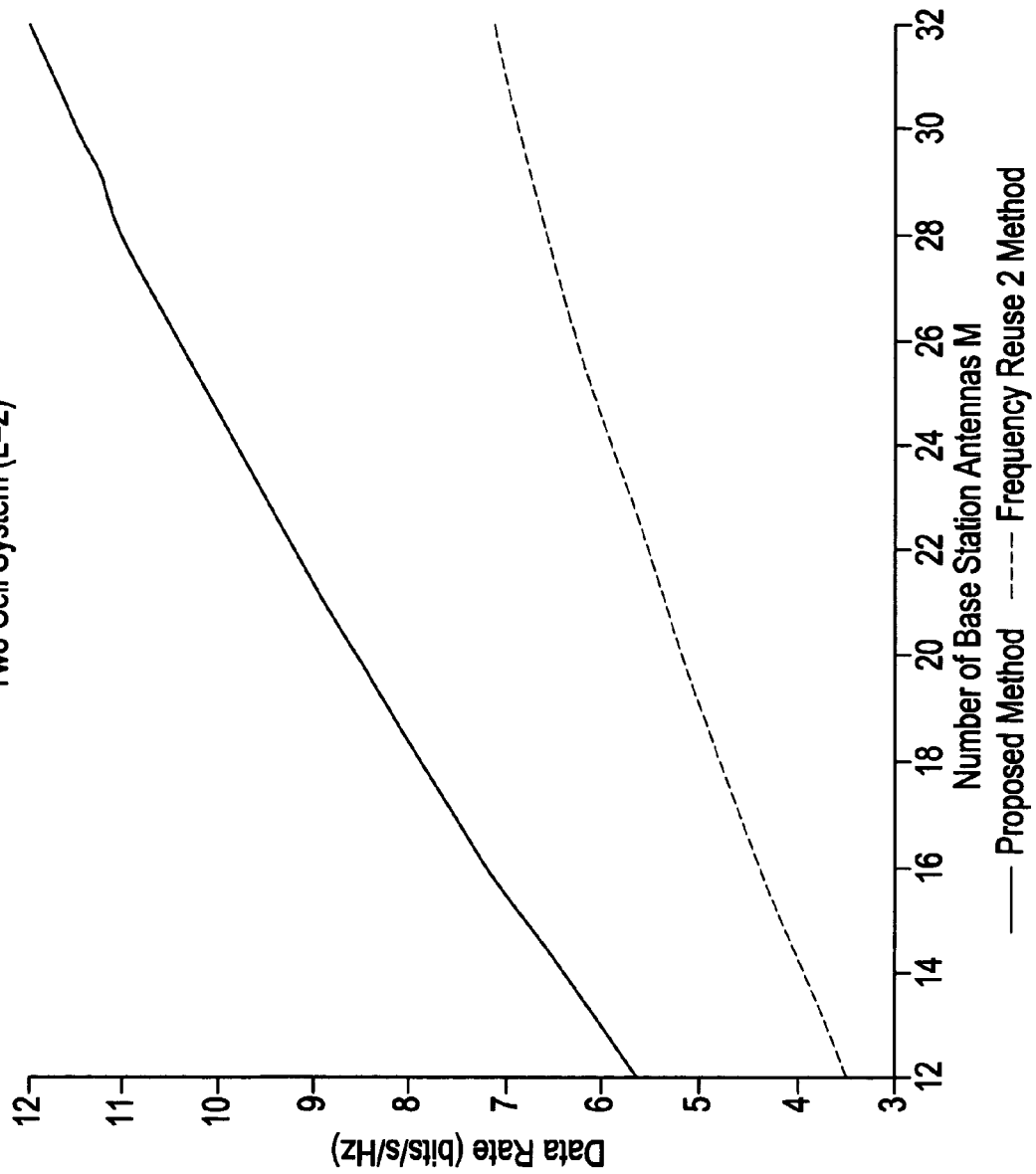
FIG. 4 shows the performance for the suggested precoding method and the conventional zero-forcing preceding method.

FIG. 4 shows the performance for example embodiments and the conventional zero-forcing precoding method (which does not cancel inter-cell interference). Through inspection of FIG. 4, one of ordinary skill can see that the method according to example embodiments provides a significant gain over the conventional zero-forcing precoding method.

As discussed above, each cell is discussed as serving K number of mobiles for the sake of clarity; however it will be understood that each cell may serve a different number of mobiles at any given time.

Conventional precoding methods for multi-user MIMO systems can be designed to reduce intra-cell interference. But, these conventional precoding methods do not suppress and/or minimize inter-cell interference. In reality, conventional algorithms for designing precoding matrices for precoding signals for transmission cannot even be used because short uplink training interval (of length τ symbols) does not allow assigning orthogonal training sequences to all users in the L cells. Because of this, rows of the estimated channel coefficient matrices $\hat{H}_{jl}$ become dependent, which precludes the use of conventional algorithms.

The invention being thus described, it will be obvious that the same may be varied in many ways. Such variations are not to be regarded as a departure from the invention, and all such modifications are intended to be included within the scope of the invention.

We claim:

1. A method of suppressing inter-cell interference in a wireless system, the method comprising:
    estimating, by a first radio equipped device in first cell, a set of estimated first channel coefficients based on signals received from a plurality of second radio equipped devices;
    estimating, by the first radio equipped device, a set of estimated second channel coefficients based on signals received from a plurality of third radio equipped devices in a second cell,
    generating, by the first radio equipped device, a precoding matrix based on the set of estimated first channel coefficients and the set of estimated second channel coefficients, the set of estimated first channel coefficients being associated with a set of first propagation channels between the plurality of second radio equipped devices in the first cell and a plurality of antennas at the first radio equipped device, and the set of estimated second channel coefficients being associated with a set of second propagation channels between the plurality of third radio equipped devices and the plurality at antennas of the first radio equipped device; and
    precoding, by the first radio equipped device, signals for transmission from the first radio equipped device to at least one second radio equipped device based on the precoding matrix.

2. The method of claim 1, further comprising:
    transmitting the precoded signals from the first radio equipped device to the at least one second radio equipped device.

3. The method of claim 1, wherein the signals received from the plurality of second radio equipped devices are training signals received from the plurality of second radio equipped devices, and the set of estimated first channel coefficients are included in an estimated first channel coefficient matrix for the set of first propagation channels, wherein the signals received from the plurality of third radio equipped devices are training signals received from the plurality of third radio equipped devices, and the set of estimated second channel coefficients are included in an estimated second channel coefficient matrix for the set of second propagation channels, and wherein the precoding matrix is generated based on the estimated first and second channel coefficient matrices.

4. The method of claim 3, wherein the generating step further comprises:
    first scaling the estimated first channel coefficient matrix based on a first diagonal matrix and a transmission power associated with the plurality of antennas at the first radio equipped device, the first diagonal matrix being a diagonal matrix of first propagation factors between the plurality of antennas at the first radio equipped device and the plurality of second radio equipped devices; and
    second scaling the estimated second channel coefficient matrix based on a second diagonal matrix and the transmission power associated with the plurality of antennas at the first radio equipped device, the second diagonal matrix being a diagonal matrix of second propagation factors between the plurality of antennas at the first radio equipped device and the plurality of third radio equipped devices; wherein
        the precoding matrix is generated based on the scaled estimated first and second channel coefficient matrices.

5. The method of claim 4, wherein the generating step further comprises:
    first multiplying the scaled estimated first channel coefficient matrix with a complex conjugate of the scaled estimated first channel coefficient matrix to generate a first product;
    second multiplying the scaled estimated second channel coefficient matrix with a complex conjugate of the scaled estimated second channel coefficient matrix to generate a second product;
    third multiplying an interference variance parameter for the wireless system with an identity matrix to generate a third product; and
    generating the precoding matrix based on the first, second and third products.

6. The method of claim 5, further comprising:
    first summing the second product and the third product to generate an aggregate product;
    scaling the aggregate product using an inter-cell interference propagation parameter; and
    second summing the scaled aggregate product and the first product; wherein
        the generating step generates the precoding matrix based on at least the second sum and a precoding matrix condition parameter.

7. The method of claim 6, wherein the precoding matrix condition parameter has a value chosen such that the generated precoding matrix satisfies a precoding matrix condition.

8. The method of claim 6, wherein the precoding matrix is the product of a reciprocal of the second sum, a reciprocal of the precoding matrix condition parameter, and the complex conjugate of the scaled estimated first channel coefficient matrix.

9. The method of claim 1, wherein the precoding step further comprises:
    mapping each signal for transmission into a plurality of sub-signals, each of the plurality of sub-signals corresponding to one of the plurality of antennas at the first radio equipped device.

10. The method of claim 9, wherein the mapping step further comprises:
    matrix multiplying each of the plurality of signals with the generated precoding matrix and a transmission power parameter to map the signals for transmission into the plurality of sub-signals, the transmission power parameter being associated with the plurality of antennas at the first radio equipped device.

11. The method of claim 1, wherein the first radio equipped device is a base station and the plurality of second and third radio equipped devices are mobiles.

12. A method for suppressing inter-cell interference in a wireless system, the method comprising:
- estimating, by a first radio equipped device in a first cell, a set of estimated first channel coefficients based on signals received from a plurality of second radio equipped devices;
- estimating, by the first radio equipped device, a set of estimated second channel coefficients based on signals received from a plurality of third radio equipped devices in a second cell;
- estimating, based on the set of estimated first channel coefficients and the set of estimated second channel coefficients, a sum of an intra-cell transmission error associated with the first cell and an inter-cell interference created by signal transmission by the first radio equipped device, the intra-cell transmission error representing a difference between signals transmitted between the first radio equipped device in the first cell and the plurality of second radio equipped devices;
- generating, at the first radio equipped device, a precoding matrix based on the estimated sum of the intra-cell transmission error and the inter-cell interference; and
- precoding, by the first radio equipped device, signals for transmission from the first radio equipped device to at least one of the plurality of second radio equipped devices using the precoding matrix.

13. The method of claim 12, further comprising:
- transmitting the precoded signals from the first radio equipped device to the at least one second radio equipped device.

* * * * *